United States Patent
Imamura

(10) Patent No.: US 7,105,755 B2
(45) Date of Patent: Sep. 12, 2006

(54) ROTARY ENCODER AND METHOD OF MANUFACTURING SUBSTRATE THEREOF

(75) Inventor: Masao Imamura, Maebashi (JP)

(73) Assignee: Tsubame Musen, Inc., Gunma (JP)

( * ) Notice: Subject to any disclaimer, the term of this patent is extended or adjusted under 35 U.S.C. 154(b) by 0 days.

(21) Appl. No.: 11/225,241

(22) Filed: Sep. 13, 2005

(65) Prior Publication Data

US 2006/0060454 A1 Mar. 23, 2006

Related U.S. Application Data

(62) Division of application No. 10/606,779, filed on Jun. 27, 2003.

(30) Foreign Application Priority Data

Aug. 30, 2002 (JP) .............................. 2002-252237

(51) Int. Cl.
*H01H 9/30* (2006.01)
(52) U.S. Cl. ................. 200/11 DA; 200/564; 200/336; 338/198; 345/156; 345/163
(58) Field of Classification Search ........... 200/11 DA, 200/11 R, 11 C, 11 G, 564, 570, 336, 179, 200/19.18; 338/198–200; 345/156, 157, 345/163–169

See application file for complete search history.

(56) References Cited

U.S. PATENT DOCUMENTS

| | | | | |
|---|---|---|---|---|
| 5,017,741 A | * | 5/1991 | Brown et al. | 174/260 |
| 5,739,775 A | * | 4/1998 | Brandestini | 341/10 |
| 6,388,211 B1 | * | 5/2002 | Nomura et al. | 200/11 DA |
| 6,396,006 B1 | * | 5/2002 | Yokoji et al. | 200/4 |
| 6,828,517 B1 | * | 12/2004 | Calkin et al. | 200/11 DA |
| 6,972,386 B1 | * | 12/2005 | McSwiggen | 200/11 R |

\* cited by examiner

Primary Examiner—Richard K. Lee
(74) Attorney, Agent, or Firm—Townsend & Banta

(57) ABSTRACT

A two-phase rotary encoder is provided which includes a substrate for the encoder which is double-faced and has a copper-foil-bonded substrate etched thereon, a first ring-shaped electrode pattern and a second ring-shaped electrode pattern formed concentrically around a center hole on the substrate, a smooth, level ring-shaped comb electrode pattern formed on an outermost periphery of the substrate, wiring patterns which cover the electrode patterns through each of external connecting terminals provided on the substrate, and a common external connecting terminal provided on an edge of the substrate, formed on a surface thereof via the center hole or a through hole. The rotary encoder further includes a resin-molded case, a shaft, a gear-shaped rotor, a click mechanism and a tact switch mechanism.

2 Claims, 13 Drawing Sheets

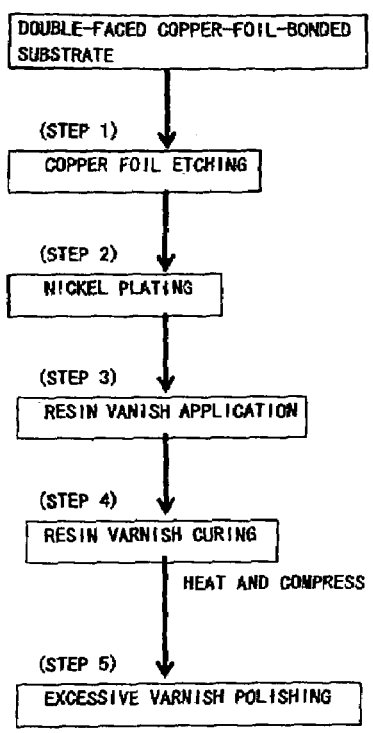
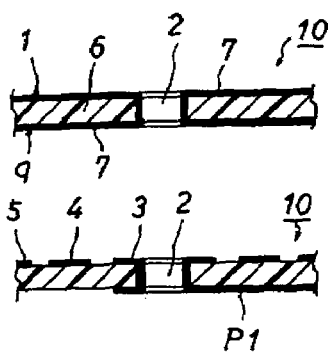
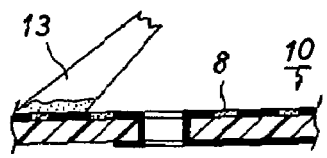
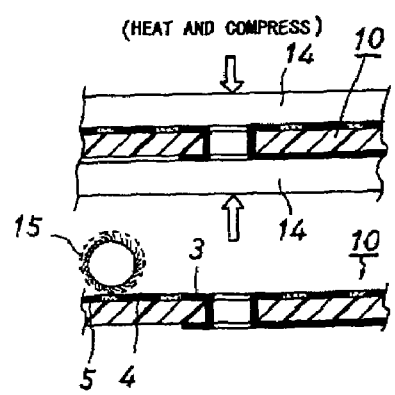

ROTARY ENCODER AND METHOD OF MANUFACTURING SUBSTRATE THEREOF

This is a division of application Ser. No. 10/606,779, filed Jun. 27, 2003.

FIELD OF THE INVENTION

The present invention relates to a structure of a contact type two-phase rotary encoder (referred also as a rotary pulse switch) and a method of manufacturing a substrate thereof.

BACKGROUND OF THE INVENTION

Contact type two-phase rotary encoders are generally used as an input change-over switch for adjustment of sound volume, tuning and the like in video and audio equipment.

Conventional two-phase rotary encoders generally comprise a ring-shaped common electrode pattern, and two ring-shaped comb electrode patterns formed from an inside to an outside of a concentric circle, with respect to a center hole, for supporting a shaft on a surface of a substrate made of an insulating resin. Two sliders having contacts for electrically connecting the common electrode pattern and the two comb electrode patterns are further provided. An intermittent opening/closing operation is performed by sliding of the contacts on the comb electrode patterns via clockwise/counterclockwise rotation of the two sliders provided on a bottom surface of a rotor mounted to the rotative shaft attached vertically to the substrate.

As illustrated in FIG. 13, in a pulse output equalizing circuit of a Vcc power source of the two-phase rotary encoder 60, pulse signals VA, VB with duty of 50% with different phases are output between a common external connecting terminal C (grounding electric potential) and two external connecting terminals A, B, respectively.

Conventional rotary encoders are disclosed in, for example, Japanese Utility Model Application Publication No. 59-22667, Japanese Patent Application Laid-Open No. 1-258328, Japanese Utility Model Application Laid-Open No. 3-26021, Japanese Patent Application Laid-Open No. 6-94476, Japanese Patent Application Laid-Open No. 7-141960, and Japanese Patent Application Laid-Open No. 7-147116. Such rotary encoders provide various devised electrode patterns of a substrate and contact structures.

Generally, rotary encoders are provided with a click mechanism, so that a rotating operation of the shaft is controlled, and, simultaneously, a rotating angle of the shaft is generally regulated to be integral multiples of the rotating angle corresponding to one click of the click mechanism.

Miniaturization, lower cost and higher reliability of contact type rotary encoders are greatly demanded by the electronic equipment manufacturing market. Since the above-mentioned prior rotary encoders, in which the two ring-shaped comb electrode patterns and the ring-shaped common electrode pattern are concentrically formed on the substrate, need a wide substrate area, however, miniaturization is difficult.

In an attempt to overcome this problem, means for dividing the comb electrode pattern into an arc shape are disclosed in several of the above publications in order to miniaturize the device, but these patterns are complicated, which negatively affects the phase accuracy of two-phase pulse output. Further, adoption of insert molding techniques increases cost and decreases reliability due to displacement problems.

With regards to substrate manufacturing problems, a raised ridge pattern exists on the comb uneven portion of the comb electrode pattern on the substrate in conventional rotary encoders, generating noise due to scraping of the sliders sliding on the comb patterns and the contacts, and abrasion of the patterns due to such scraping negatively influences the reliability thereof. Japanese Patent Application Laid-Open No. 6-94476 discloses means for coating the entire surface of the comb electrode pattern with a resistor material such that the surface becomes flat, and generating a pulse signal by means of a difference in thickness of the resistor on the uneven pattern of the comb pattern. This, however, is more costly, and reliability of properties of the comb electrode pattern is decreased due to a fluctuation of a potential difference of the pulse signal caused by abrasion of the resistor.

There is a demand for a rotary encoder, having a tact switch, which is switched on by pushing the shaft to a shaft direction. However, it is difficult to miniaturize a combination of the rotary encoder mechanism and the tact switch mechanism, and is too costly at this time.

SUMMARY OF THE INVENTION

The present invention is devised in order to solve the above problems, and its object is to provide a rotary encoder, which can be manufactured using microminiaturization techniques, has a low cost, and is highly reliable, and a method of manufacturing its substrate.

In order to achieve the above object in a first embodiment, a rotary encoder is provided having: a substrate formed with first and second ring-shaped electrode patterns concentrically around a center hole on its surface and a ring-shaped comb electrode pattern without a difference in level on an outermost periphery, wiring patterns covering the electrode patterns through each of three external connecting terminals provided on an edge being formed on a surface or a back surface of the substrate; a case latched with the substrate, the case having a circular hole on a center of its upper surface; a shaft inserted into the circular hole of the case to be supported rotatively, a lower end shaft portion of the shaft being inserted into the center hole of the substrate; a gear-shaped rotor supported to a bottom surface of the shaft in the case, the rotor being rotated together with the shaft; a click mechanism for elastically nipping a ball pressured by a plate spring provided in the case into a concave portion on an outer periphery of said rotor so as to regulate a rotating angle of the shaft; and a first slider, mounted to a lower surface of the rotor, for electrically connecting the first ring-shaped electrode pattern and the ring-shaped comb electrode pattern, and a second slider for electrically connecting the second ring-shaped electrode pattern and the ring-shaped comb electrode pattern, the first slider and said second slider outputting pulse signals with different phases.

In a second embodiment, the two-phase rotary encoder according to the first embodiment above is provided, further having a switch board having a circular conductor pattern on a center of its surface, a horseshoe conductor pattern around the circular conductor pattern and two switch terminals wired on the conductor patterns, respectively, provided on a bottom surface of the substrate of said encoder; a dome type conductor having repulsiveness placed on the conductor patterns on the surface of the switch board; the shaft being energized to a shaft direction by a spring provided on a bottom surface of the shaft and simultaneously supported to the substrate of the encoder so as to be slidable up and down, and the shaft having a tact switch mechanism for electrically connecting the switch terminals in such a manner that the shaft is pressured in the shaft direction, and thus its lower end shaft portion deforms a center portion of the dome conductor on the switch board.

In a third embodiment, a method of manufacturing the substrate of the rotary encoder according to the first and second embodiments above is provided, comprising: an etching step comprising etching a resin substrate in which metal foil is bonded to its surface and back surface so as to form the first and second ring-shaped electrode patterns provided concentrically around the center hole and the ring-shaped comb electrode pattern on the outermost periphery as electrode patterns; a plating step comprising metal-plating the three electrode patterns of the resin substrate; a resin varnish applying step comprising applying and sur-printing resin varnish to a concave portion on the ring-shaped comb electrode pattern after the etching so as to remove excess resin varnish from the surface; a resin varnish curing step comprising heating and compressing the resin substrate so as to cure the resin varnish surprinted into the concave portion; and a polishing step comprising polishing and removing the excess varnish remaining on the metal surfaces of the electrode patterns, so as to flatten the surfaces of the electrode patterns.

BRIEF DESCRIPTION OF THE DRAWINGS

FIG. 12(a) is a process flow chart showing a method of manufacturing the substrate of the encoder of the present invention.

FIG. 12(b) illustrates the substrate (i.e., double-faced copper-foil-bonded substrate) of the rotary encode of the present invention at the beginning of the manufacturing step shown in FIG. 12(a).

FIG. 12(c) illustrates the substrate shown in FIG. 12(a) after being etched, as called for in Step 1 in FIG. 12(a).

FIG. 12(d) illustrates the condition of the substrate shown in FIG. 12(b) upon being subjected to the resin varnish curing of Step 4 as shown in FIG. 12(a).

FIG. 12(e) illustrates the substrate shown in FIG. 12(d) undergoing heating and compression, as called for between Step 4 and Step 5 of FIG. 12(a).

FIG. 12(f) illustrates the substrate shown in FIG. 12(e) being subjected to excessive varnish polishing, as called for in Step 5 of FIG. 12(a).

DETAILED DESCRIPTION OF THE INVENTION

Figure 1:
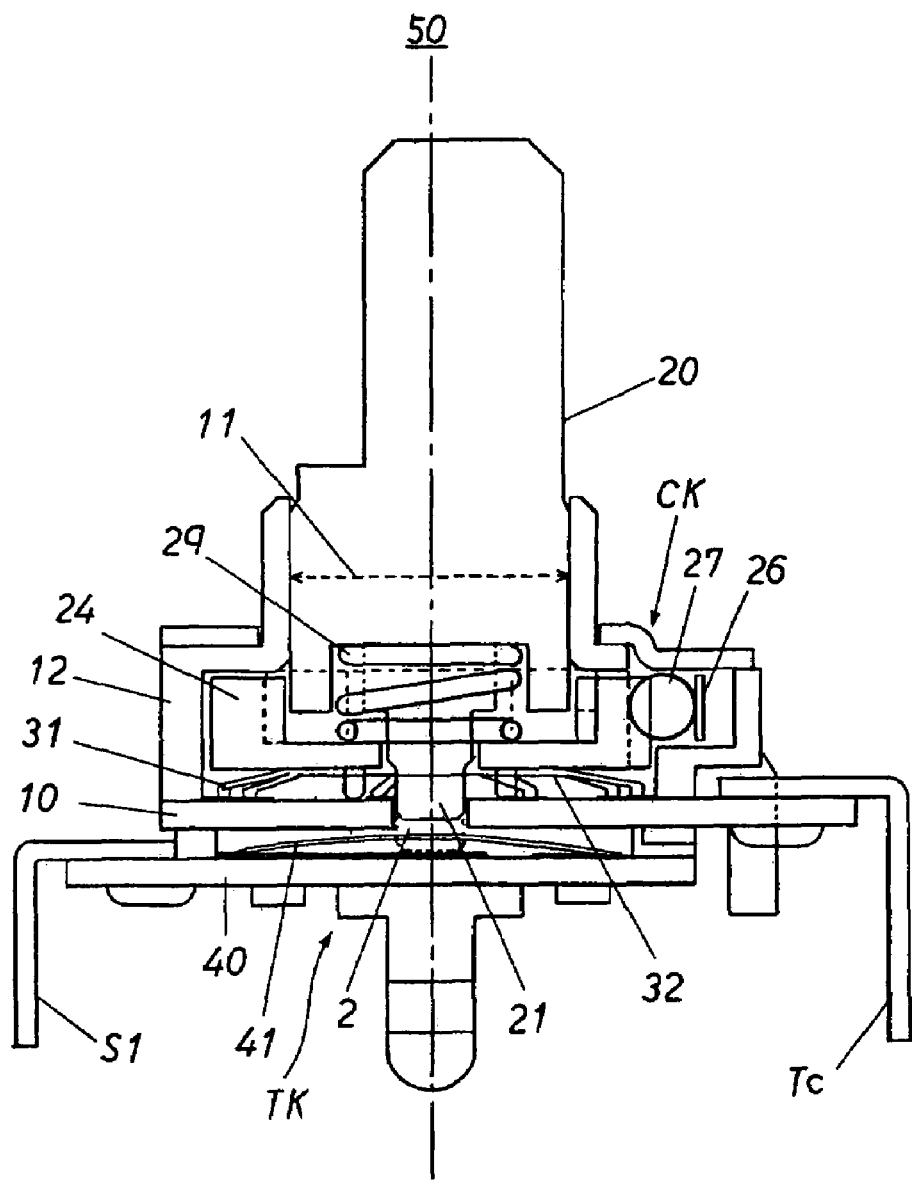
FIG. 1 is a longitudinal cross sectional view of a two-phase rotary encoder (with tact switch) according to the present invention.
Figure 4:
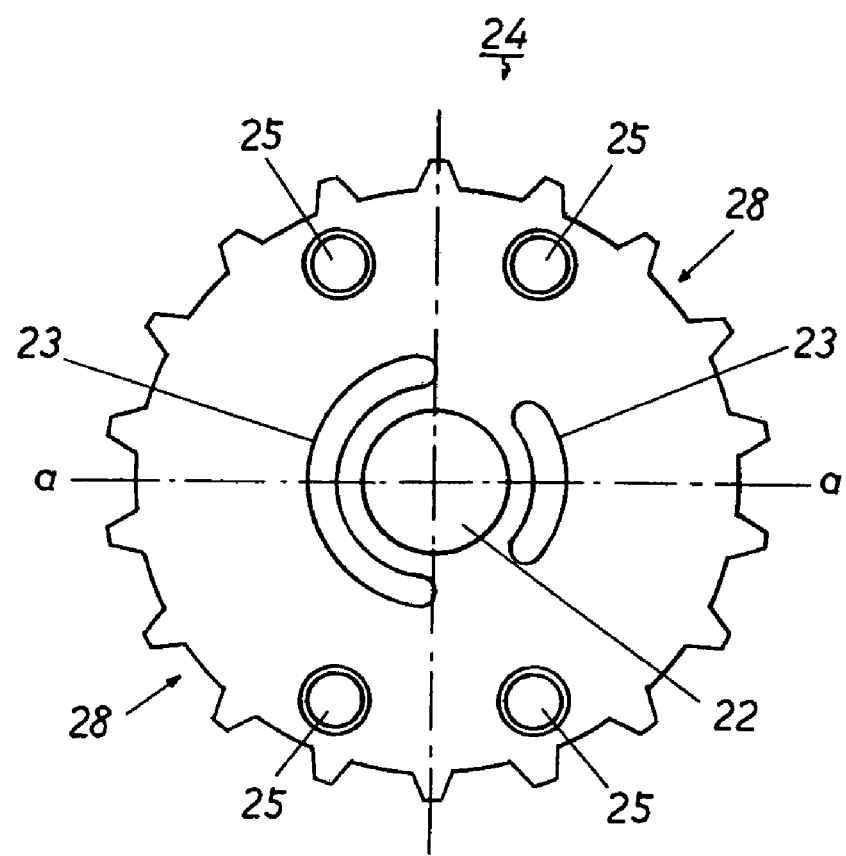
FIG. 4 is a bottom view of a rotor.

A two-phase rotary encoder 50 shown in FIG. 1 according to the present invention includes a substrate 10 for the rotary encoder, a case 12, a shaft 20, a rotor 24 whose outer periphery has a gear shape as shown in FIG. 4, a click mechanism CK, a first slider 31 and a second slider 32. In the substrate 10, a first ring-shaped electrode pattern 3, a second ring-shaped electrode pattern 4, and a flat, level ring-shaped comb electrode pattern 5 formed on an outermost periphery; are formed concentrically around a center hole 2 on a surface 1 shown in FIG. 2.

Figure 3:
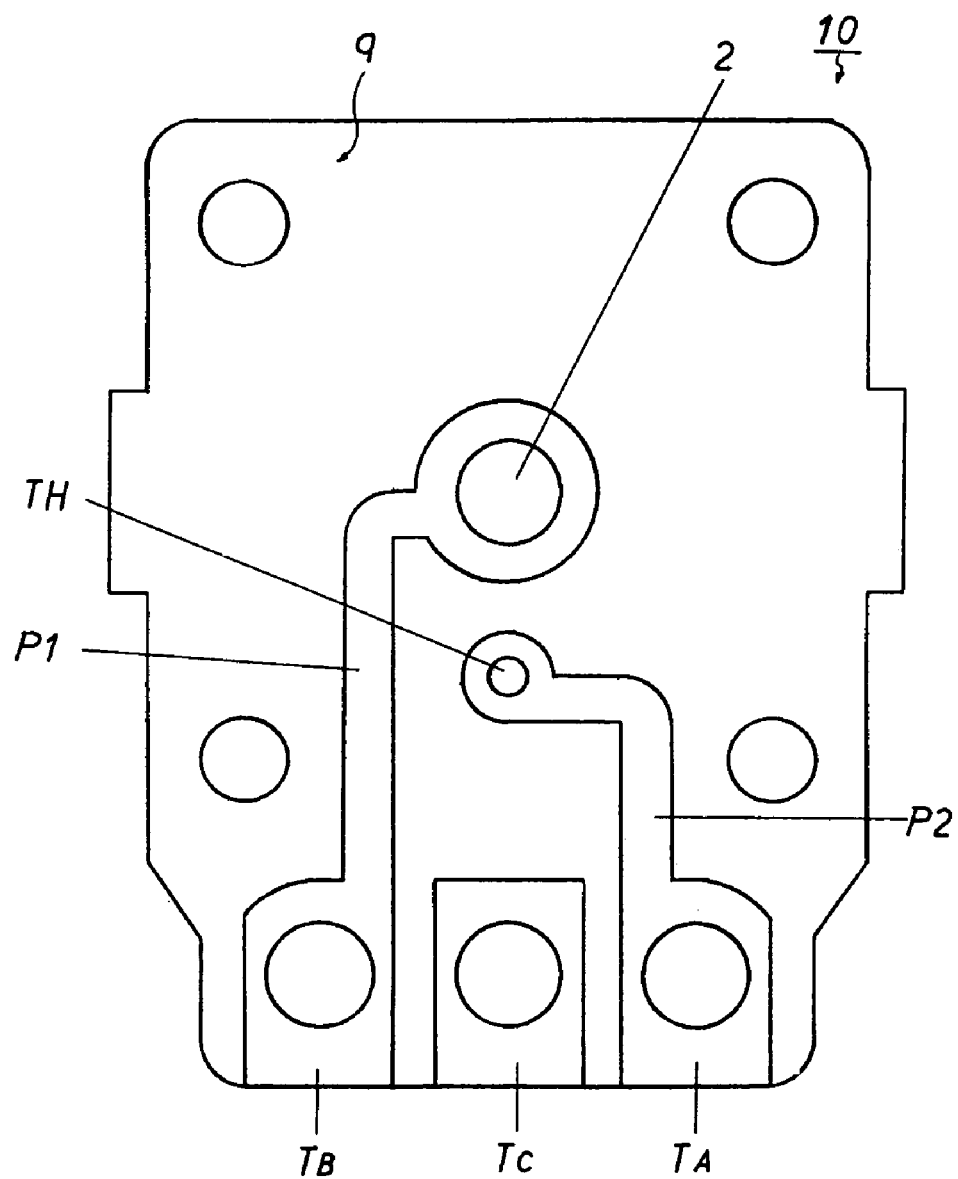
FIG. 3 is a back view of the substrate of the rotary encoder shown in FIG. 1.

Wiring patterns P1, P2, P3, which reach three external connecting terminals $T_B$, $T_A$, $T_C$, respectively, are provided adjacent an edge of electrode patterns 3, 4, 5, are formed on the surface 1 or, as shown in FIG. 3, a back surface 9 via the center hole 2 or a through hole TH. The case 12 is secured onto the substrate 10, and has a cylindrical circular hole 11 formed therein in the center of an upper surface thereof. The shaft 20 has a lower end shaft portion 21 fitted into and through the center hole 2 of the substrate 10, and is inserted into the circular hole 11 of the case 12 so as to be rotatively supported.

Figure 8:
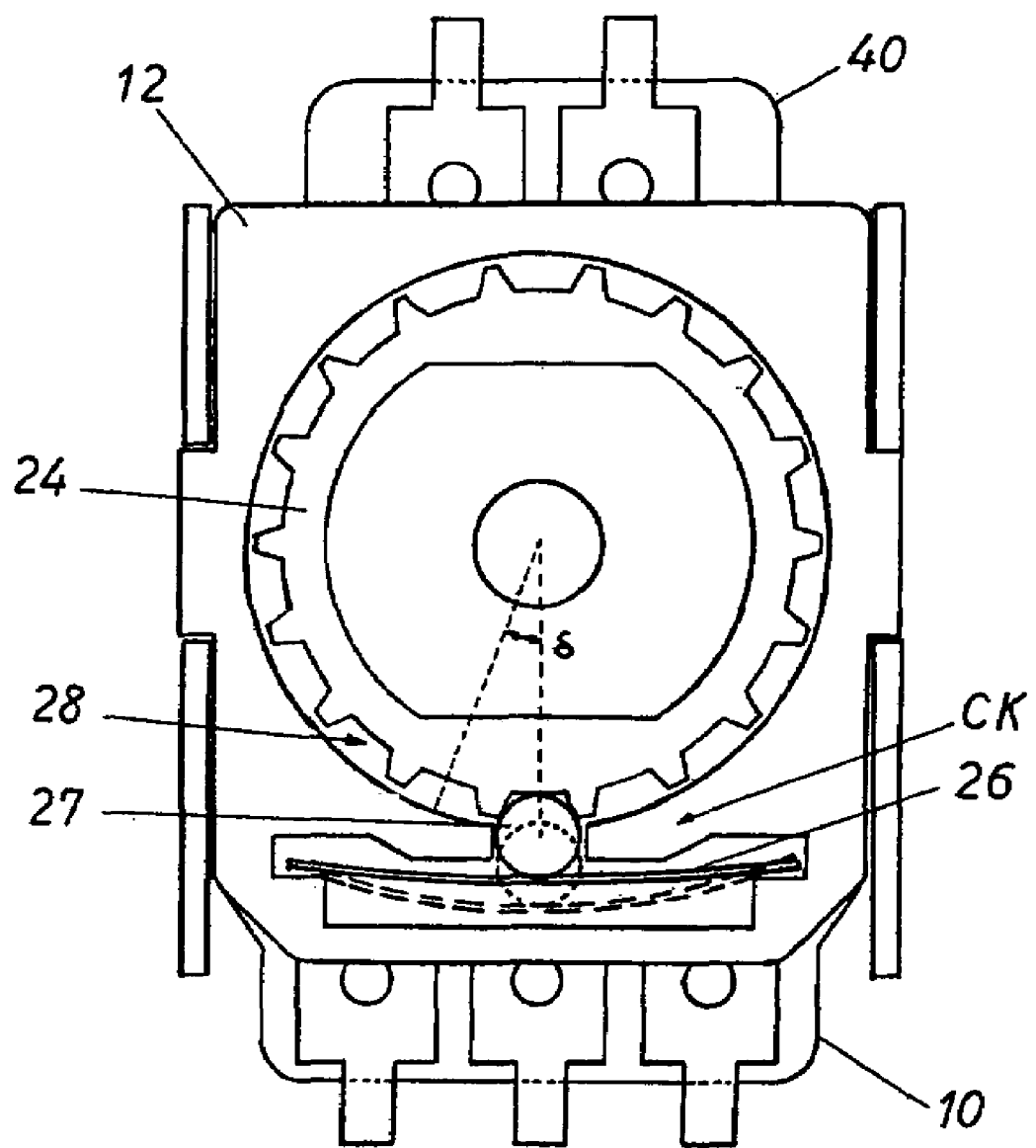
FIG. 8 is a plan view of the rotary encoder, showing a state thereof when a shaft is removed, so as to illustrate the click mechanism inside a case.

The rotor 24 is supportively engaged with a bottom surface of the shaft 20 in the case 12, and turns together with the shaft 20. The click mechanism CK allows a ball 27 pressured in a center direction by a plate spring 26 provided in the case 12, as shown in FIG. 8, to be elastically displaced by a gear-shaped concave portion 28 on the outer periphery of the rotor 24 (see broken lines), so as to regulate a rotating angle of the shaft 20 to integral multiples of a minimum rotating angle δ.

Figure 2:
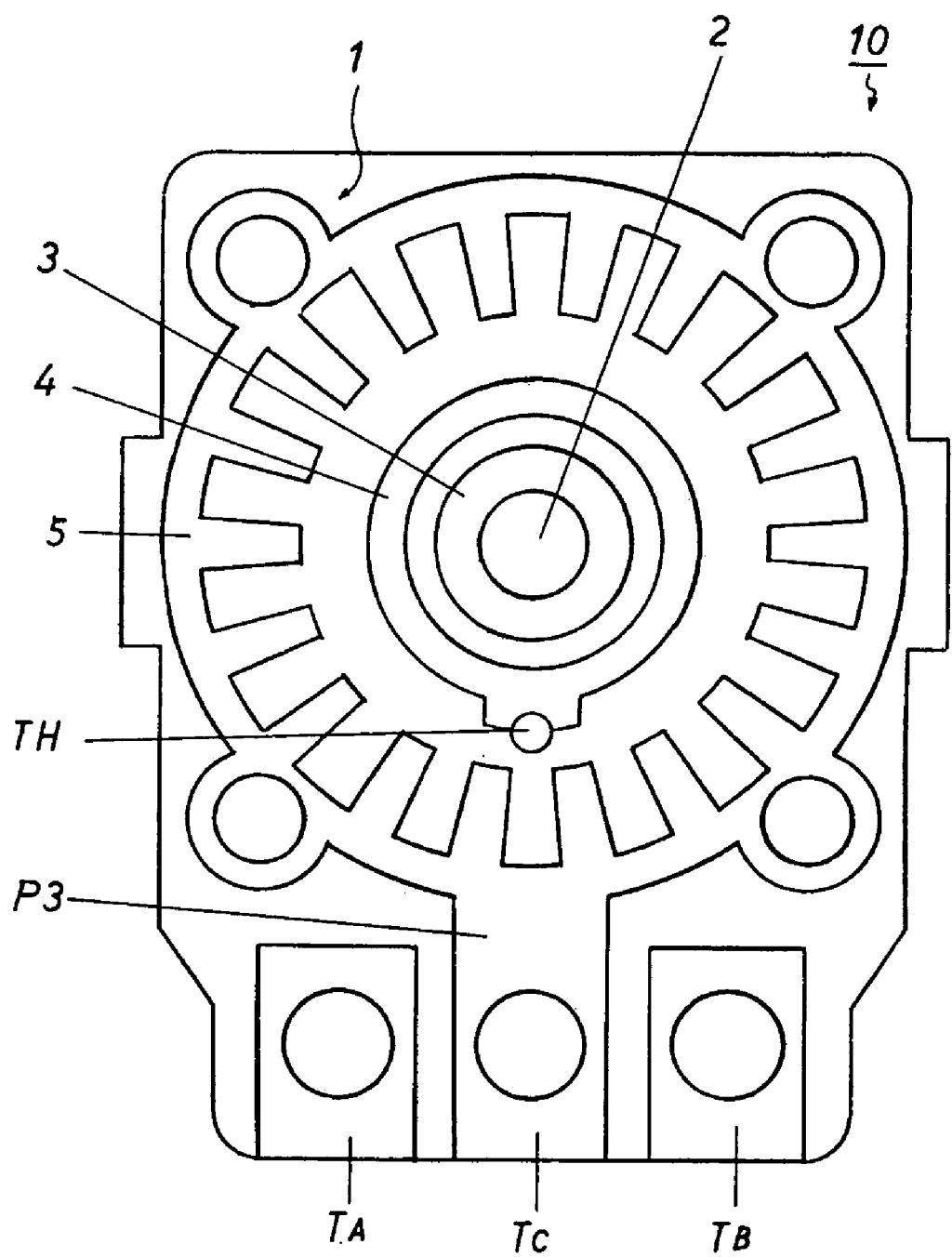
FIG. 2 is a front view of a substrate of the rotary encoder shown in FIG. 1.

The first slider 31 is mounted on a lower surface of the rotor 24, and electrically connects the first ring-shaped electrode pattern 3 with the ring-shaped comb electrode pattern 5 shown in FIG. 2. The second slider 32 is mounted on a lower surface of the rotor 24, opposite the first slider 31, and electrically connects the second ring-shaped electrode pattern 4 and the ring-shaped comb electrode pattern 5. The first slider 31 and the second slider 32 carry out switching output functions with different phases B, A.

The shaft 20 is a resin-molded member. The substrate 10 is formed with the electrode patterns 3, 4, 5, or the like, by selectively etching a double-faced printed board, such as a phenol resin substrate, in which copper foil is bonded to both surfaces. The concave portion of the comb portion of the ring-shaped comb electrode pattern 5 is filled with cured resin varnish, eliminating all ridges or elevated areas, and rendering the electrode pattern 5 flat.

The case 12 is an insulating box formed by resin molding, in which an area on a lower surface thereof in contact with the surface 1 of the substrate 10 is opened, and is engaged with the substrate 10 so as to be secured thereto.

Figure 5:
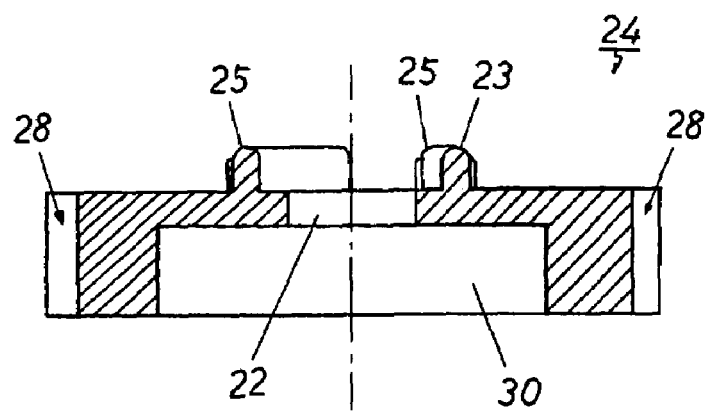
FIG. 5 is a cross sectional view of the rotor.

The rotor 24 is a resin-molded member and, as shown in FIGS. 4 and 5, is provided with an arc-shaped protrusion 23 positioned adjacent the center hole 22 formed in the bottom surface thereof, the protrusion 23 coming into electrical contact with the substrate 10; and a plurality of small protrusions 25 to which the sliders 31, 32 are affixed. The outer periphery of the rotor 24 has a gear shape, and its concave portion 28 constitutes a component of a click mechanism CK, described in detail hereinafter. The upper surface of the rotor 24 is provided with a concave groove 30, into which the shaft 20 is fitted.

Figure 6:
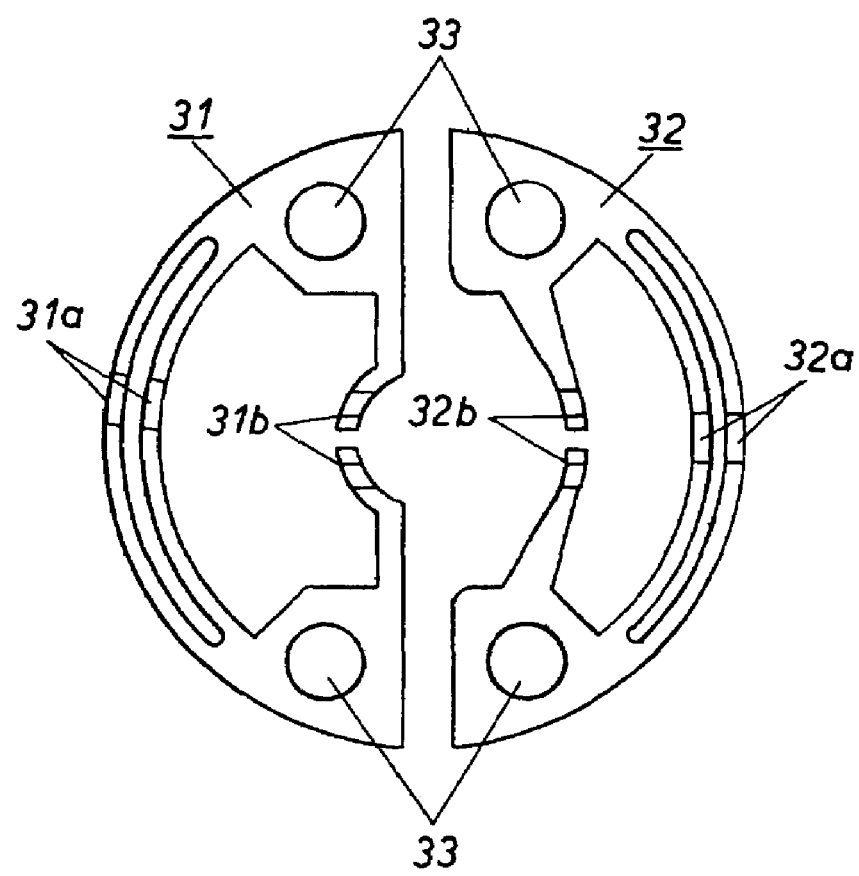
FIG. 6 is a plan view of sliders.
Figure 7:
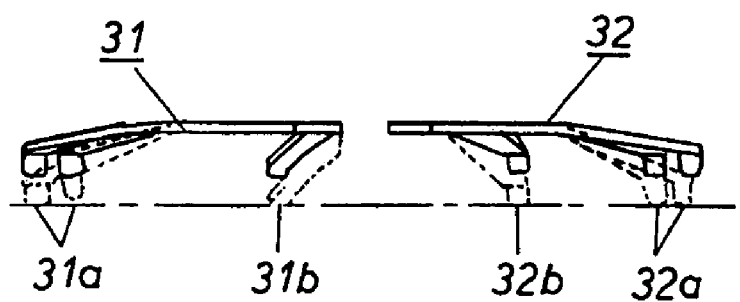
FIG. 7 is a side view of the sliders.

The first slider 31 and the second slider 32 are manufactured by punching a thin metal plate having a spring property into an appropriate shape as in, for example, in FIG. 6. As shown in FIG. 7, the contacts 31a, 31b, 32a, 32b are elastically deformed from a natural state (shown by a broken line) to a pressured state (shown by a solid line) by elastic forces. As a result, outer contacts 31a and 32a come in contact with the ring-shaped comb electrode pattern 5, and inner contacts 31b, 32b come in contact with the first ring-shaped electrode pattern 3 and the second ring-shaped electrode pattern 4, respectively. The first slider 31 and the second slider 32 are provided with small holes 33 for adhesively affixing the sliders to the small protrusions 25 formed on the bottom surface of the rotor 24.

The click mechanism CK moderates and controls the rotating operation of the shaft 20, as well as providing stable clockwise/counterclockwise rotation for switching output. As illustrated in FIG. 8, the outer periphery of the rotor 24 is provided with eighteen convex portions forming a gear shape with equal intervals, and when the minimum rotating angle δ of one click is 20°, the rotating angle is always regulated to integral multiples of 20°. When rotational force on the shaft 20 is ceased, the ball 27 (steel ball) is elastically displaced into a concave portion 28, thus stabilizing and regulating the rotating angle of the rotor 24.

Figure 10:
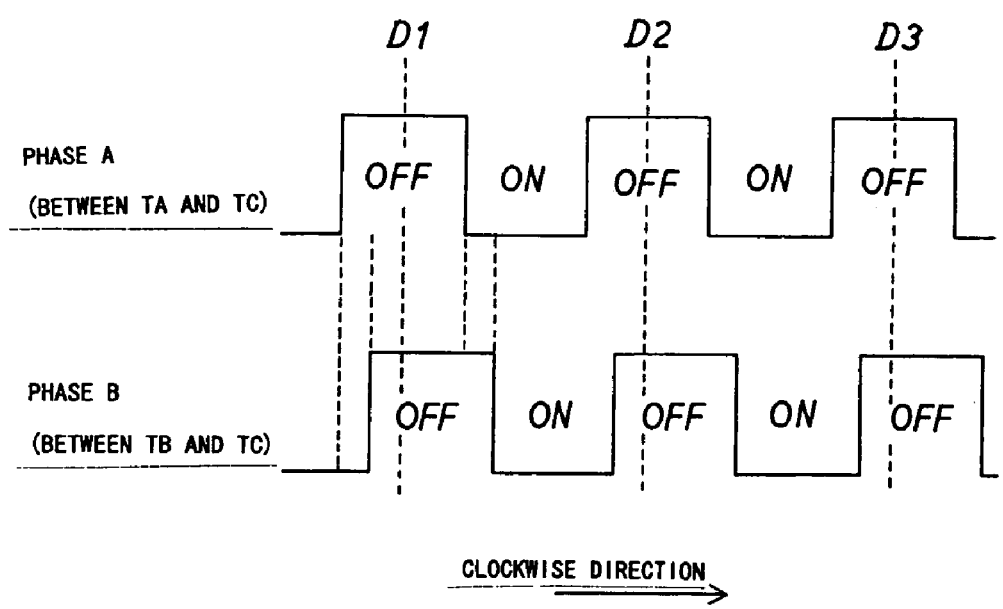
FIG. 10 is a phase diagram showing a pulse output waveform of a rotary encoder of the present invention.

The positions of the contacts of the first slider 31 and the second slider 32 are thereby adjusted, and timing of two-phase output A, B is set so as to assemble the timing waveform shown in FIG. 10 (duty: 50%). As a result, at click stable points D1, D2, D3, . . . of the click mechanism CK, a waveform of the phase A (between terminals TA and TC) is at a center where the output becomes high level to be stable when the switch is in the OFF position. In the clockwise direction of rotation, the phase A is first changed from ON to OFF, so that a pulse signal is generated, and the phase B (between TB and TC) is delayed by a predetermined phase difference is changed from ON to OFF, so that a pulse signal is generated. In the counterclockwise direction of rotation, the phase B is first changed from ON to OFF, so that a pulse signal is generated, and the phase A is delayed by a predetermined phase difference and is changed from ON to OFF, so that a pulse signal is generated. A detection is made, therefore, as to which phase A or B generates the pulse signal first, so that the rotating direction can be determined, and thus a judgment can be made as to whether, for example, an audio volume is increased or decreased.

Figure 11:
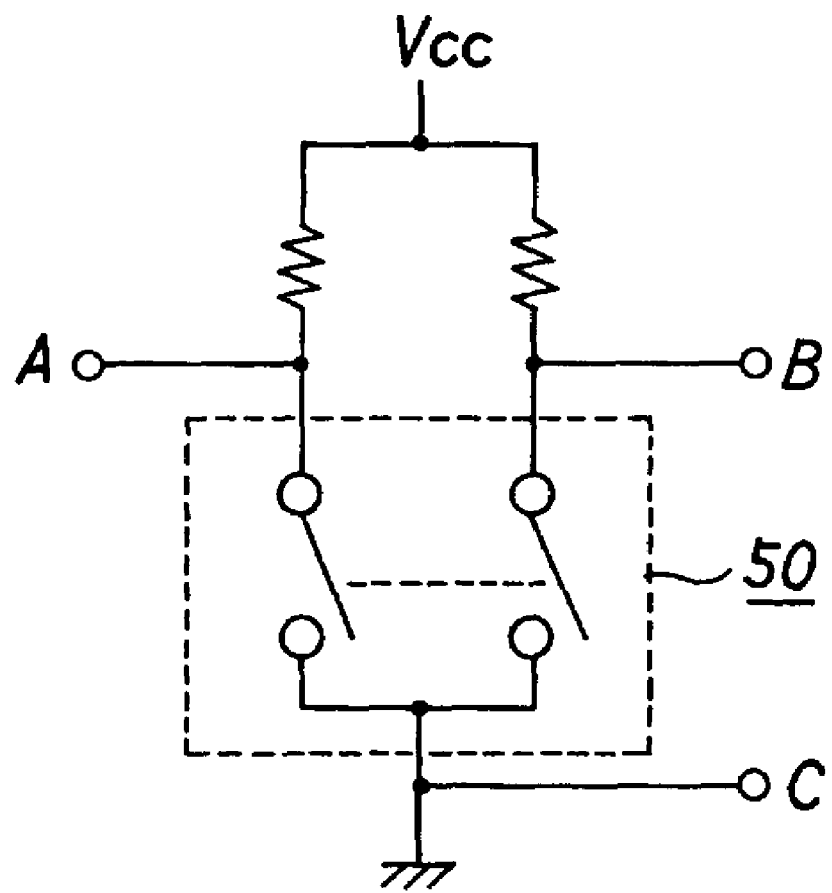
FIG. 11 is an equalizing circuit diagram of the encoder.
Figures 13A, 13B:
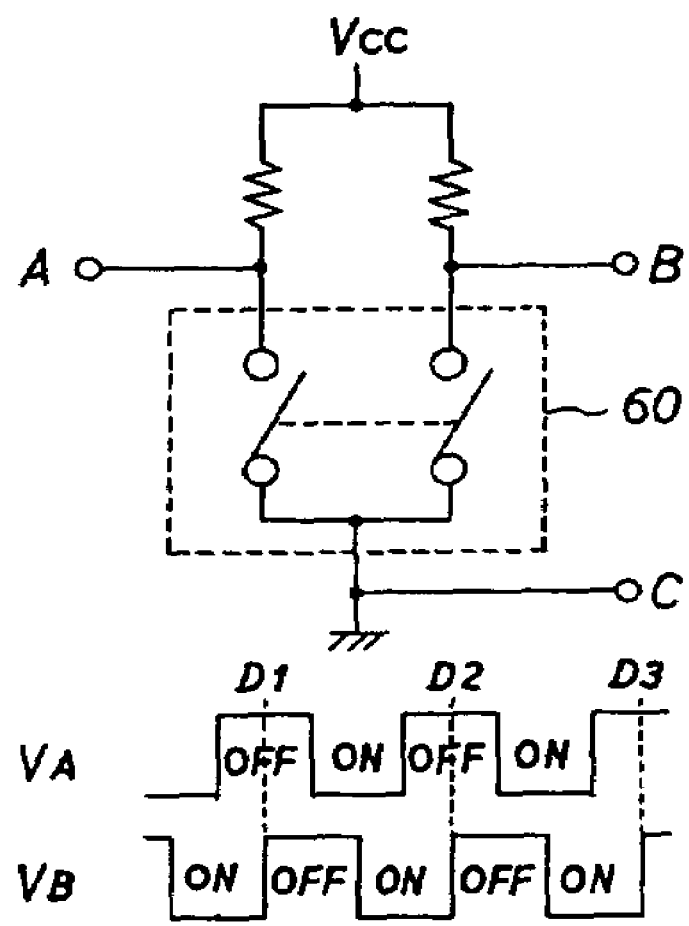
FIG. 13(a) is a pulse output equalizing circuit diagram of a conventional rotary encoder.
FIG. 13(b) is a phase diagram showing a pulse output waveform of a conventional rotary encoder.

In the above structure of the rotary encoder 50, the switching equalizing circuit is as shown in FIG. 11, and the one ring-shaped comb electrode pattern 5 is wired as a common electrode pattern on the common external connecting terminal TC, and the first ring-shaped electrode pattern 3 and the second ring-shaped electrode pattern 4 are arranged on the external connecting terminals TB, TA, respectively. A position of an opening/closing contact is different from that in the pulse output equalizing circuit of a Vcc power source in the conventional rotary encoder 60 in FIG. 13.

It is generally considered that the contact which is closer to the grounding potential is stably and preferably opened and closed. The arrangement, such that a predetermined phase difference between the phase B and the phase A of the first slider 31 and the second slider 32 is given to the ring-shaped comb electrode pattern 5 having a completely circular shape, can be determined more easily and with higher accuracy in comparison with a combination of the arc-shaped electrode patterns in the prior arts, and is more stable.

Figure 9:
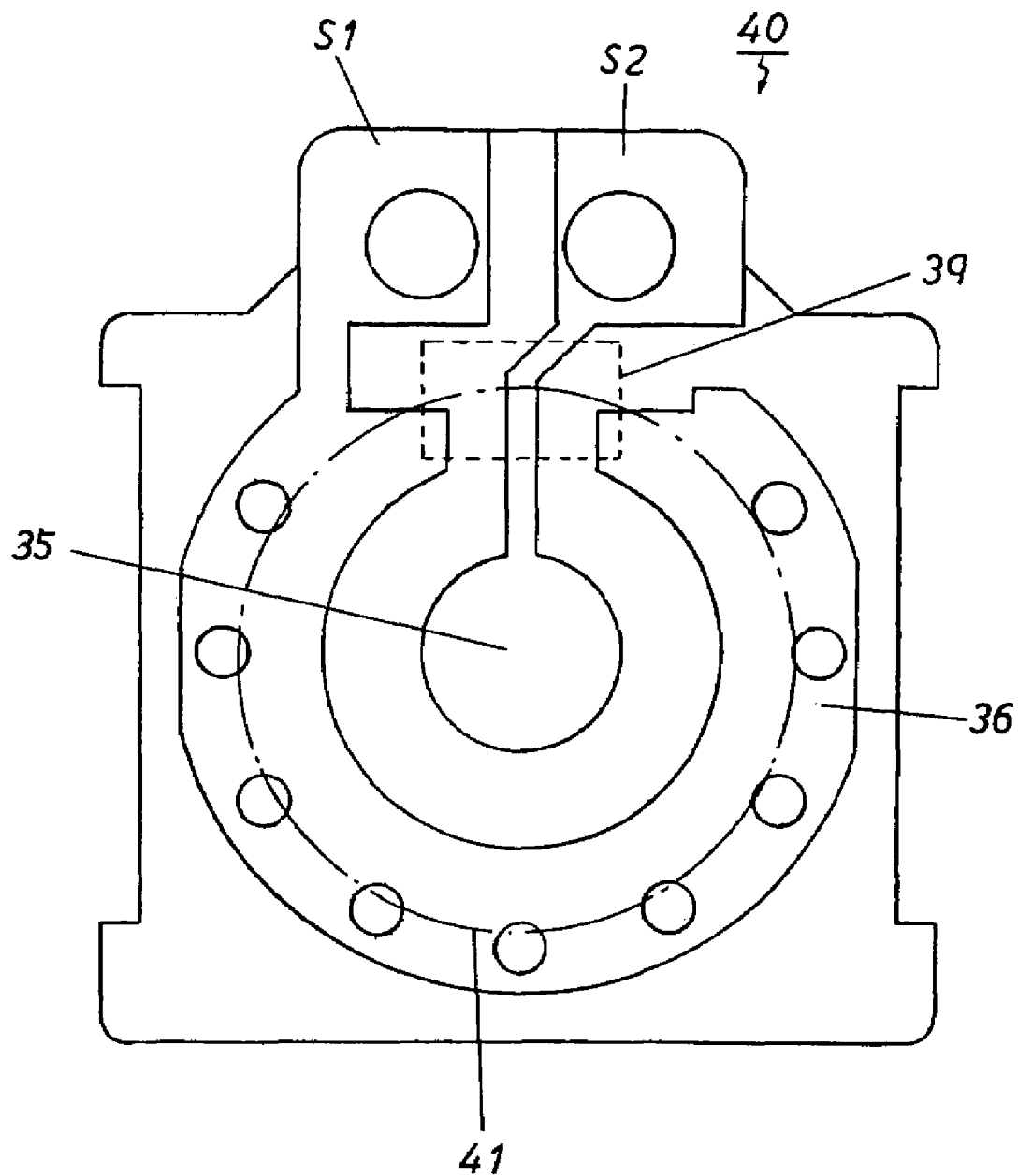
FIG. 9 is a plan view of a rotary encoder of the present invention, showing a conductor pattern of a switch board.

The rotary encoder 50, as shown in FIG. 1 is additionally provided with a tact switch mechanism TK. As shown in FIG. 9, a switch board 40, which has a circular conductor pattern 35 on a center of its surface, a horseshoe conductor pattern 36 around said circular conductor pattern 35, and two switch terminals S1, S2 wired on these conductor patterns, respectively, is provided on the bottom surface of the substrate 10 of the encoder with a gap of less than 1 mm.

A circular convex dome type conductor 41 is placed on the conductor pattern 36 on the surface of the switch board 40, as illustrated by alternate long and short dashed lines. The shaft 20 is forced into the shaft direction by spring 29 provided on a bottom surface of the shaft 20, and simultaneously supported by the substrate 10 of the encoder so as to be slidable up and down. When the shaft 20 is pressed from above towards the shaft direction by 0.5 mm, its lower end shaft portion 21 is inserted through the center hole 2 of the substrate 10, so as to push and deform an apex of the dome conductor 41 on the switchboard 40, and the switch terminals S1, S2 are electrically connected with each other via the dome conductor 41.

When downward force upon the shaft 20 is released, the spring 29 pushes the shaft 20 upward, allowing the dome conductor 41 to return to its original convex shape, thus opening the closed tact switch. Within the broken line area in FIG. 9 is an insulating film 39, made of a resin or the like, which covers the wiring patterns covering the circular conductor pattern 35 to the switch terminal S2.

The tact switch mechanism TK is simple and takes up less volume. Thus, it can be provided on the rotary encoder 50 by increasing the bottom surface of the encoder mechanism by a thickness of only about 1 to 2 mm. The provision of the tact switch can facilitate adjustment of a physical quantity by means of the encoder mechanism and determination of a physical quantity by means of the tact switch mechanism.

By utilizing the novel structures provided by the present inventors herein, the two-phase rotary encoder 50 of the present invention can be microminiature in size. That is to say, its entire dimension falls within a range such that a dimension H is 4.5 mm, a longitudinal dimension Y is 9.2 mm and a lateral dimension X is 8.4 mm.

A conventional method of manufacturing the electrode patterns on the switch board 40 typically comprises punching a metal plate, such as a brass plate, on a press, so as to insert-mold resin therein. A die is, however, complicated and cannot be miniaturized, and displacement of the contacts, as well as defective short circuits due to the displacement of the contacts frequently occurs. The conventional comb electrode pattern manufacturing method includes a method of etching a metal plate and insert-molding the metal plate in a resin. In such method, however, defective molding at the time of the insert frequently occurs.

The present invention, therefore, does not adopt the insert molding method, but further utilizes a method of etching a resin substrate (double-faced copper-foil-bonded substrate) where metal foil, particularly copper foil, is bonded to both the surfaces so as to manufacture the conductor patterns such as the ring-shaped comb electrode pattern 5, the two ring-shaped electrode patterns 3, 4 and the wiring patterns P1, P2, P3. However, with only etching used, the contacts of the sliders 31, 32 abut against the comb uneven portion of the ring-shaped comb electrode pattern 5 when the shaft is rotated, thus creating noise and abrading the ring-shaped comb electrode pattern 5.

It is, therefore, desired that the uneven portion is made level, and the surface of the electrode pattern which is roughened by the etching is smoothed. In the present invention, particularly after the etching step, resin varnish is poured at least into the uneven portions of the ring-shaped comb electrode pattern 5 which are removed by the copper foil etching, the resin varnish is heated and compressed so as to be cured, and excess thin cured film is removed from the surface of the copper foil. With this substrate manufacturing method, a complicated die is not required to punch the electrode patterns, many types of shapes can be formed easily, and miniaturization of the device is simplified. Since the surface of the ring-shaped comb electrode pattern to become a common electrode is a flat, level surface, it has abrasion resistance, and the timing of the phase difference easily obtains accuracy so that the cost is reduced.

In the present invention as shown in FIG. 12, an etching step (step 1), a plating step (step 2), a resin varnish applying step (step 3), a resin varnish curing step (step 4) and a polishing step (step 5) are successively executed. The etching step selectively etches the substrate 10 (double-faced copper-foil-bonded substrate) in which the metal foil (preferably the copper foil 7) is bonded to the surface 1 and the back surface 9 using masking, so as to form the first and second ring-shaped electrode patterns 3, 4 provided concentrically around the center hole 2 and the ring-shaped comb electrode pattern 5 on the outermost periphery of the electrode patterns on substrate 10. The plating step metal-plates (nickel plating or the like) the three electrode patterns of the resin substrate.

The resin varnish applying step, as shown in FIG. 12(c) applies and surprints resin varnish 8, by a squeegee 13 or the like, at least within the concave portion of the substrate 10 surface, including the ring-shaped comb electrode pattern 5, after the etching, so as to remove excessive resin varnish from the surface. The resin varnish curing step, as shown in FIG. 12(d), nips the resin substrate 10 between mold releases 14, 14, and heats and compresses it so as to cure the resin varnish 8 surprinted into the concave portion. The polishing step, as shown in FIG. 12(e), polishes and removes a thin film of the excess varnish remaining on the metal surfaces of the electrode patterns 3, 4, 5 using a brush 15 or the like, so as to flatten the surfaces of the electrode patterns 3, 4, 5.

Since the above manufacturing method of the present invention does not involve insert molding, the cost is lower and involves formation of the pattern with high accuracy. At least the comb uneven portion of the ring-shaped comb electrode pattern 5 becomes flat and level, allowing the sliders 31, 32 to slide smoothly with less friction, so that abrasion of the electrode surfaces and generation of noise can be suppressed. The rotary encoder 50 of the present invention having a long life and high reliability, can thus be obtained.

According to the substrate manufacturing method of the present invention, since the material of the substrate is not limited and thus a flexible substrate can be adopted, the electrode patterns may be formed on a circuit of a cellular phone, for example, by the etching process, and the surfaces of the electrode patterns flattened and smoothed, thereby enabling the rotary encoder of the present invention to be incorporated directly into the flexible substrate.

With the rotary encoder and the substrate manufacturing method thereof according to the present invention, the following benefits are obtained:

(1) Since the substrate of the encoder is formed only with the one ring-shaped comb electrode pattern and the first and second ring-shaped electrode patterns, miniaturization of the device is possible.

(2) High reliability of the device is obtained by flattening and smoothing the comb portion of the ring-shaped comb electrode pattern.

(3) The cost of manufacturing is low and the method is simplified.

(4) The rotary encoder with the microminiature tact switch can be provided at a low cost using the compact and simple tact switch mechanism provided therein.

(5) The forming accuracy of the electrode patterns on the substrate is high.

What is claimed is:

1. A rotary encoder, comprising:
a substrate having a front center hole, a back surface, an outermost periphery, first and second ring-shaped electrode patterns formed on the surface concentrically around the center hole, and a ring-shaped comb electrode pattern without a difference in level formed adjacent an outermost periphery, wiring patterns covering the electrode patterns through each of three external connecting terminals provided on the outermost periphery on the front surface or back surface of said substrate;
a case having an open end, edges adjacent said open end and a circular hole formed in a center of an upper surface thereof, said case being secured to the substrate at the edges of the open case;
a shaft rotatively inserted through the circular hole of said case, so as to to be supported thereby, a lower end shaft portion of said shaft further being rotatively inserted into the center hole of said substrate;
a gear-shaped rotor supported by a bottom surface of said shaft in said case, said rotor having an outer periphery, being rotated simultaneously with and by said shaft;
a click mechanism capable of elastically displacing a ball bearing subject to elastic pressure exerted by a plate spring provided in said case into a concave portion on the outer periphery of said rotor, so as to regulate a rotating angle of said shaft; and
a first slider, affixed to a lower surface of said rotor, for electrically connecting the first ring-shaped electrode pattern and the ring-shaped comb electrode pattern, and a second slider for electrically connecting the second ring-shaped electrode pattern and the ring-shaped comb electrode pattern, said first slider and said second slider outputting pulse signals with different phases.

2. The rotary encoder according to claim 1, further comprising:
a switch board having a circular conductor pattern on a center of its surface, a horseshoe conductor pattern around the circular conductor pattern and two switch terminals wired on the conductor patterns, respectively, provided on a bottom surface of said substrate of said encoder; and
a dome type conductor having repulsiveness placed on the conductor patterns on the surface of said switch board;
wherein said shaft is energized to a shaft direction by a spring provided on a bottom surface of said shaft and simultaneously supported to said substrate of said encoder so as to be slidable up and down, and said shaft has a tact switch mechanism for electrically connecting the switch terminals in such a manner that said shaft is pressured in the shaft direction and thus its lower end shaft portion deforms a center portion of the dome conductor on said switch board.

* * * * *